US011955872B2

(12) United States Patent
Kunii

(10) Patent No.: US 11,955,872 B2
(45) Date of Patent: Apr. 9, 2024

(54) DRIVE DEVICE

(71) Applicant: HONDA MOTOR CO., LTD., Tokyo (JP)

(72) Inventor: Hiroshi Kunii, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 302 days.

(21) Appl. No.: 17/679,846

(22) Filed: Feb. 24, 2022

(65) Prior Publication Data

US 2022/0311306 A1 Sep. 29, 2022

(30) Foreign Application Priority Data

Mar. 26, 2021 (JP) ................................ 2021-054063

(51) Int. Cl.

*H02K 5/22* (2006.01)
*B60R 16/02* (2006.01)
*H01R 9/22* (2006.01)
*H02K 7/00* (2006.01)

(52) U.S. Cl.

CPC ............ *H02K 5/225* (2013.01); *H01R 9/223* (2013.01); *H02K 7/006* (2013.01); *B60R 16/0215* (2013.01)

(58) Field of Classification Search

CPC ........ H02K 5/225; H02K 7/006; H01R 9/223; H01R 9/18; B60R 16/0215; H05K 9/0007; H05K 9/0098

USPC ........................................................... 310/71

See application file for complete search history.

(56) References Cited

U.S. PATENT DOCUMENTS

| | | | | |
|---|---|---|---|---|
| 8,776,936 B2 * | 7/2014 | Mimura | B62K 25/005 180/291 |
| 2009/0243443 A1 * | 10/2009 | Aoki | H02K 11/05 310/68 D |
| 2009/0251018 A1 * | 10/2009 | Koshida | H02K 5/225 310/71 |
| 2017/0158042 A1 * | 6/2017 | Miyazawa | B60L 1/02 |
| 2022/0311306 A1 * | 9/2022 | Kunii | H01R 9/223 |

FOREIGN PATENT DOCUMENTS

JP 2013-147046 A 8/2013

* cited by examiner

*Primary Examiner* — Ahmed Elnakib

(74) *Attorney, Agent, or Firm* — Paratus Law Group, PLLC

(57) ABSTRACT

A drive device includes: a drive unit including a rotary electric machine and a drive unit case that houses the rotary electric machine; a control unit including a control device configured to control the rotary electric machine; and a connection unit including a connection line that electrically connects the rotary electric machine and the control device. The control unit is disposed at a position facing the outer peripheral surface of the drive unit case. A space portion is provided between the outer peripheral surface of the drive unit case and the control unit. The connection unit is provided such that the connection line electrically connects the rotary electric machine and the control device through the space portion.

4 Claims, 8 Drawing Sheets

DRIVE DEVICE

CROSS REFERENCE TO RELATED APPLICATIONS

This application claims priority to Japanese Patent Application No. 2021-054063 filed on Mar. 26, 2021, the content of which is incorporated herein by reference.

TECHNICAL FIELD

The present invention relates to a drive device that drives a vehicle or the like.

BACKGROUND ART

In recent years, electric vehicles such as hybrid vehicles, battery-driven vehicles, and fuel cell vehicles have been widely used, and these electric vehicles are equipped with a drive device including a rotary electric machine such as an electric motor or a generator and a control unit that controls the rotary electric machine. For example, JP 2013-147046 A discloses a drive device including a transverse engine, a motor generator, a belt type continuously variable transmission, and a control unit including a motor controller that controls the motor generator and an inverter.

In the drive device of JP 2013-147046 A, the control unit is disposed at a position facing outer peripheral surfaces of the motor generator and the belt type continuously variable transmission, and the motor generator and the inverter are connected by a three-phase AC harness (connection line). A connection position between the three-phase AC harness (connection line) and the rotary electric machine and a connection position between the three-phase AC harness (connection line) and the control unit are both on a right side of the control unit, and the three-phase AC harness (connection line) is disposed in a space surrounded by an internal combustion engine, a bellows pipe serving as one of internal combustion engine accessory components, an outer peripheral surface of the rotary electric machine, and the control unit.

However, since high-voltage power for driving the motor generator flows through the three-phase AC harness (connection line) of JP 2013-147046 A, an electromagnetic noise is generated from the three-phase AC harness (connection line). Therefore, the drive device of JP 2013-147046 A has a problem in that the electromagnetic noise generated from the three-phase AC harness (connection line) is easily propagated to an outside such as a vehicle interior.

An object of the present invention is to provide a drive device capable of preventing an electromagnetic noise generated from a connection line from propagating to an outside.

SUMMARY OF INVENTION

An aspect of the present invention provides a drive device that includes: a drive unit including a rotary electric machine and a drive unit case that houses the rotary electric machine; a control unit including a control device configured to control the rotary electric machine and a control unit case that houses the control device; and a connection unit including a connection line that electrically connects the rotary electric machine and the control device. The connection line includes: an extending portion extending in a predetermined direction; a rotary-electric-machine-side connection terminal portion provided at one end portion of the extending portion and electrically connected to the rotary electric machine; and a control-device-side connection terminal portion provided at another end portion of the extending portion and electrically connected to the control device. The drive unit case has an outer peripheral surface extending in a circumferential direction of a rotation axis line of the rotary electric machine. The control unit is disposed at a position facing the outer peripheral surface of the drive unit case. A space portion is provided between the outer peripheral surface of the drive unit case and the control unit. The connection unit is provided such that the connection line electrically connects the rotary electric machine and the control device through the space portion.

DESCRIPTION OF EMBODIMENTS

Figure 1:
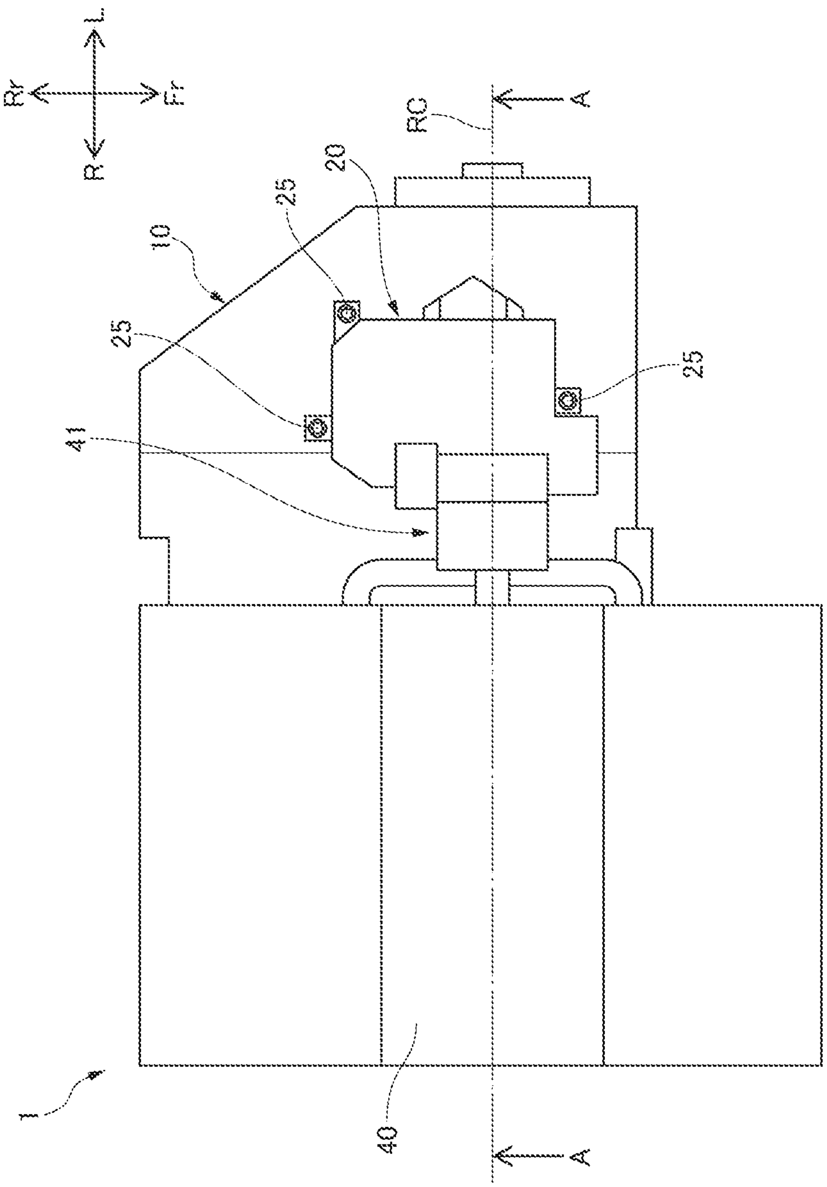
FIG. 1 is a top view of a drive device according to an embodiment of the present invention as viewed from above.

Hereinafter, a drive device mounted on a vehicle will be described as an embodiment of a drive device according to the present invention with reference to the accompanying drawings. It should be noted that the drawings are viewed in directions of reference numerals. In the present specification and the like, in order to simplify and clarify the description, a front-rear direction, a left-right direction, and an upper-lower direction are described in accordance with directions viewed from a driver of the vehicle. In the drawings, a front side of the vehicle is denoted by Fr, a rear side thereof is denoted by Rr, a left side thereof is denoted by L, a right side thereof is denoted by R, an upper side thereof is denoted by U. and a lower side thereof is denoted by D. Further, in the present specification and the like, the left-right direction is also referred to as a vehicle width direction.

<Overall Configuration of Drive Device>

Figure 2:
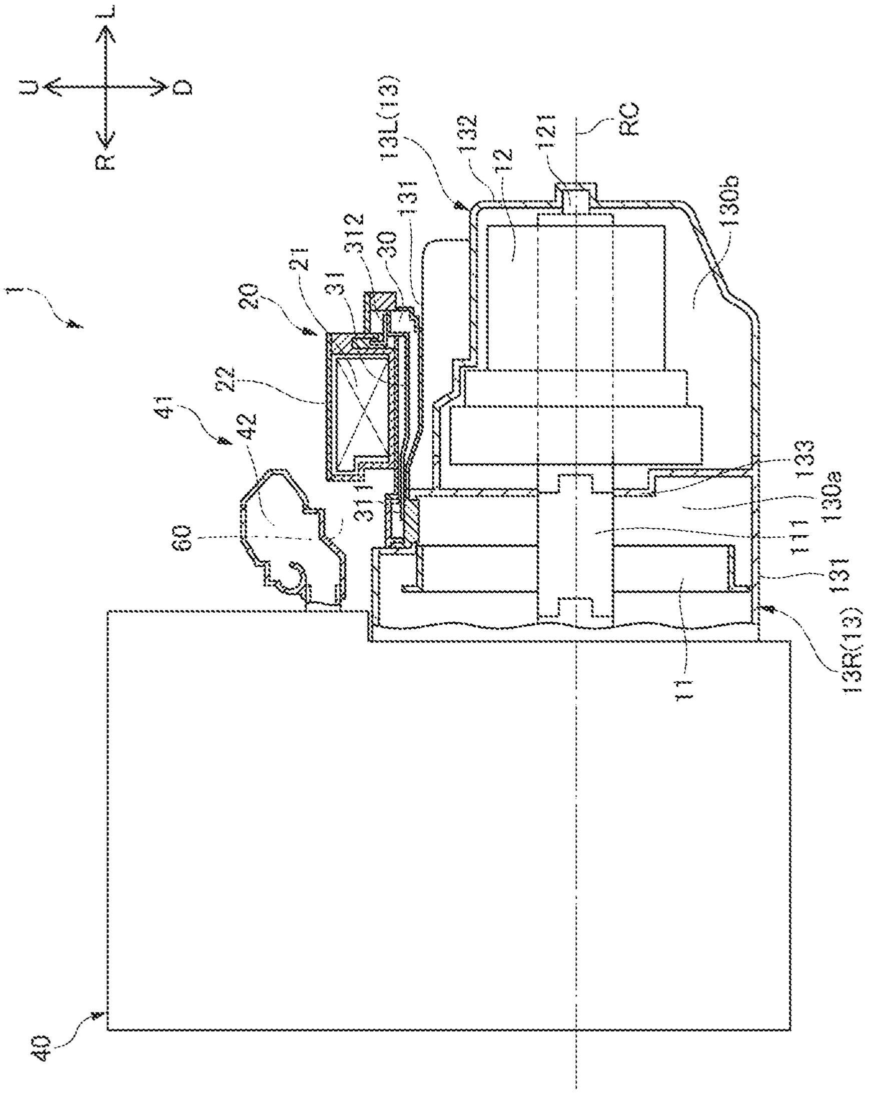
FIG. 2 is a view showing main parts of a cross section taken along a line A-A of FIG. 1.

As shown in FIGS. 1 and 2, a drive device 1 according to the present embodiment includes a drive unit 10, a control unit 20, a connection unit 30, and an internal combustion engine 40.

The control unit 20 is disposed above the drive unit 10. The connection unit 30 is disposed between the drive unit 10 and the control unit 20. The internal combustion engine 40 is disposed adjacent to a right side of the drive unit 10.

<Drive Unit>

The drive unit 10 includes a rotary electric machine 11, a transmission 12, and a drive unit case 13 that houses the rotary electric machine 1l and the transmission 12.

The rotary electric machine 11 is disposed such that a rotation axis line RC extends in the vehicle width direction (left-right direction). The rotary electric machine 11 includes a rotary shaft 111 centered on the rotation axis line RC.

It should be noted that in the present specification and the like, unless otherwise specified, the terms “axial direction”, “radial direction”, and “circumferential direction” refer to directions based on the rotation axis line RC of the rotary electric machine 11. In the present embodiment, the axial direction coincides with the vehicle width direction (left-right direction).

As shown in FIG. 2, the rotary electric machine 11 and the transmission 12 are disposed adjacent to each other in the vehicle width direction such that the rotary electric machine 11 is on the right side and the transmission 12 is on the left side.

The transmission 12 includes an input shaft 121 that is coupled to the rotary shaft 111 of the rotary electric machine 11 and to which rotational power of the rotary electric machine 11 is input from the rotary shaft 111. A rotation axis line of the input shaft 121 of the transmission 12 is the rotation axis line RC of the rotary electric machine 11, and is on the same axis as the rotary shaft 111 of the rotary electric machine 11.

The drive unit case 13 is divided into a rotary electric machine housing portion 130*a* that houses the rotary electric machine 11 and a transmission housing portion 130*b* that houses the transmission 12. The rotary electric machine housing portion 130*a* and the transmission housing portion 130*b* are disposed adjacent to each other in the vehicle width direction such that the rotary electric machine housing portion 130*a* is on the right side and the transmission housing portion 130*b* is on the left side.

The drive unit case 13 includes an outer peripheral surface 131 that surrounds the rotary electric machine 11 and the transmission 12 and extends in the circumferential direction in a cylindrical shape when viewed in the axial direction, a left side wall portion 132 that closes a left end portion of the outer peripheral surface 131 and constitutes a left side surface of the drive unit case 13, and a partition wall 133 that is provided inside the cylindrical interior of outer peripheral surface 131 and partitions the rotary electric machine housing portion 130*a* and the transmission housing portion 130*b*. In the present embodiment, a right end portion of the outer peripheral surface 131 is open and is in contact with a left wall portion of the internal combustion engine 40 to be described later. Further, the opening of the right end portion of the outer peripheral surface 131 is closed by the left wall portion of the internal combustion engine 40 to be described later, and a right end portion of the rotary electric machine housing portion 130*a* is sealed by the left wall portion of the internal combustion engine 40.

The drive unit case 13 is divided into a right case 13R constituting a right region of the outer peripheral surface 131 and the partition wall 133 of the drive unit case 13, and a left case 13L constituting a left region of the outer peripheral surface 131 and the left side wall portion 132 of the drive unit case 13.

<Control Unit>

As shown in FIGS. 5 to 8, the control unit 20 includes a control device 21 that controls the rotary electric machine 11 of the drive unit 10, a control unit case 22 that houses the control device 21, and three connection lines 23 electrically connected to the control device 21.

The control device 21 includes, for example, a step-up and step-down converter, an inverter that converts DC power and three-phase AC power, a reactor, and a capacitor unit.

The control unit case 22 extends in the front-rear direction and the left-right direction, and is formed of, for example, a conductive material such as metal. The control unit case 22 includes a substantially flat plate-shaped upper wall portion 22U constituting an upper surface of the control unit case 22, a substantially flat plate-shaped bottom wall portion 22D that faces the upper wall portion 22U, extends in the front-rear direction and the left-right direction, and constitutes a lower surface of the control unit case 22, a left wall portion 22L that extends in the up-down direction and the front-rear direction from a left end edge of the upper wall portion 22U to a left end edge of the bottom wall portion 22D, and constitutes a left side surface of the control unit case 22, a right wall portion 22R that extends in the up-down direction and the front-rear direction from a right end edge of the upper wall portion 22U to a right end edge of the bottom wall portion 22D, and constitutes a right side surface of the control unit case 22, a front wall portion 22F that extends in the up-down direction and the left-right direction from a front end edge of the upper wall portion 22U to a front end edge of the bottom wall portion 22D, and constitutes a front surface of the control unit case 22, and a rear wall portion 22B that extends in the up-down direction and the left-right direction from a rear end edge of the upper wall portion 22U to a rear end edge of the bottom wall portion 22D, and constitutes a rear surface of the control unit case 22.

Each of the three connection lines 23 is a flat plate-shaped bus bar. The three connection lines 23 extend in parallel with each other, and are inserted through an insertion hole 221 provided in the left wall portion 22L of the control unit case 22. One end portion of each of the connection lines 23 is connected to the control device 21, and the other end portion of each of the connection lines 23 is exposed to a left outer side of the left wall portion 22L of the control unit case 22. A connection terminal 231 connected to the connection unit 30 to be described later is formed at the other end portion of each of the connection lines 23. Each of the connection terminals 231 has a flat rectangular shape substantially orthogonal to the up-down direction, and is provided with an insertion hole penetrating in the up-down direction.

A terminal protection wall portion 222 is provided on the left wall portion 22L of the control unit case 22 so as to protrude to the left outer side from the left wall portion 22L of the control unit case 22 and surround an upper side, a left side, a front side, and a rear side of the connection terminals 231 of the three connection lines 23. An opening portion 222*a* is formed in an upper surface of the terminal protection wall portion 222 above the connection terminals 231. The control unit 20 further includes a terminal cover member 24 that closes the opening portion 222*a* in the upper surface of the terminal protection wall portion 222.

<Connection Unit>

Figure 3:
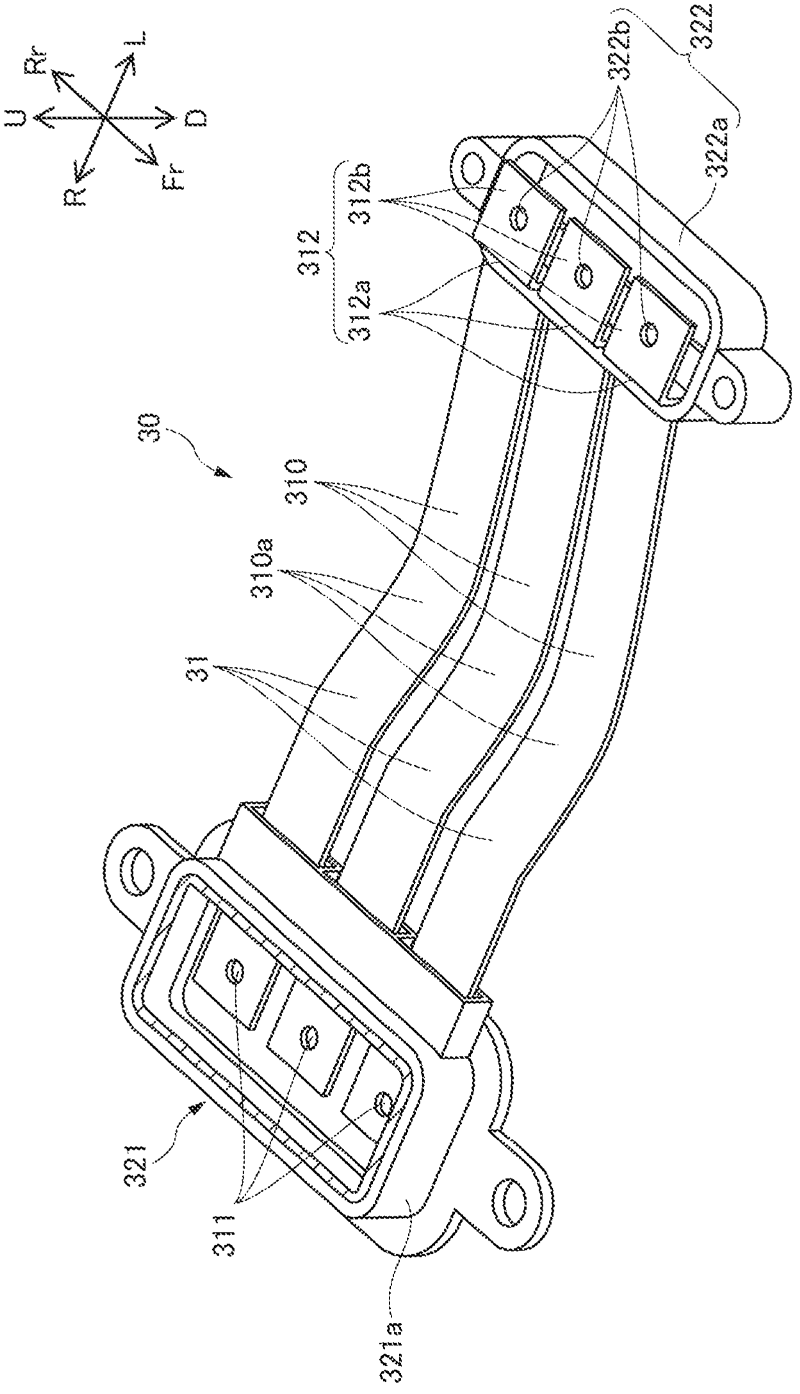
FIG. 3 is a perspective view of a connection unit of the drive device of FIG. 1.

As shown in FIG. 3, the connection unit 30 includes three connection lines 31 that electrically connect the rotary electric machine 11 of the drive unit 10 and the control device 21 of the control unit 20. The three connection lines 31 extend in the left-right direction in parallel.

Each of the connection lines 31 includes an extending portion 310 extending in the left-right direction, a rotary-electric-machine-side connection terminal portion 311 formed at a right end portion of the extending portion 310 and electrically connected to the rotary electric machine 11 of the drive unit 10, and a control-device-side connection terminal portion 312 formed at a left end portion of the extending portion 310 and electrically connected to the control device 21 of the control unit 20. In the present embodiment, the extending portions 310 are flat plate-shaped bus bars.

The rotary-electric-machine-side connection terminal portions 311 extend rightward from the right end portions of the extending portions 310, and have a flat rectangular shape substantially orthogonal to the up-down direction. The rotary-electric-machine-side connection terminal portions 311 are provided with insertion holes penetrating in the up-down direction.

Each of the control-device-side connection terminal portions 312 includes a bent portion 312*a* that is bent upward from the left end portion of the connection line 31 and extends in the up-down direction, and a terminal portion 312*b* that is bent leftward from the upper end portion of the bent portion 312*a* and has a flat rectangular shape substantially orthogonal to the up-down direction. The terminal portions 312*b* are provided with insertion holes penetrating in the up-down direction.

The connection unit 30 includes a rotary-electric-machine-side connection terminal housing 321 that houses the rotary-electric-machine-side connection terminal portions 311, and a control-device-side connection terminal housing 322 that houses the control-device-side connection terminal portions 312.

The rotary-electric-machine-side connection terminal housing 321 covers the rotary-electric-machine-side connection terminal portions 311 and a part of the right end sides of the extending portions 310.

Figure 4:
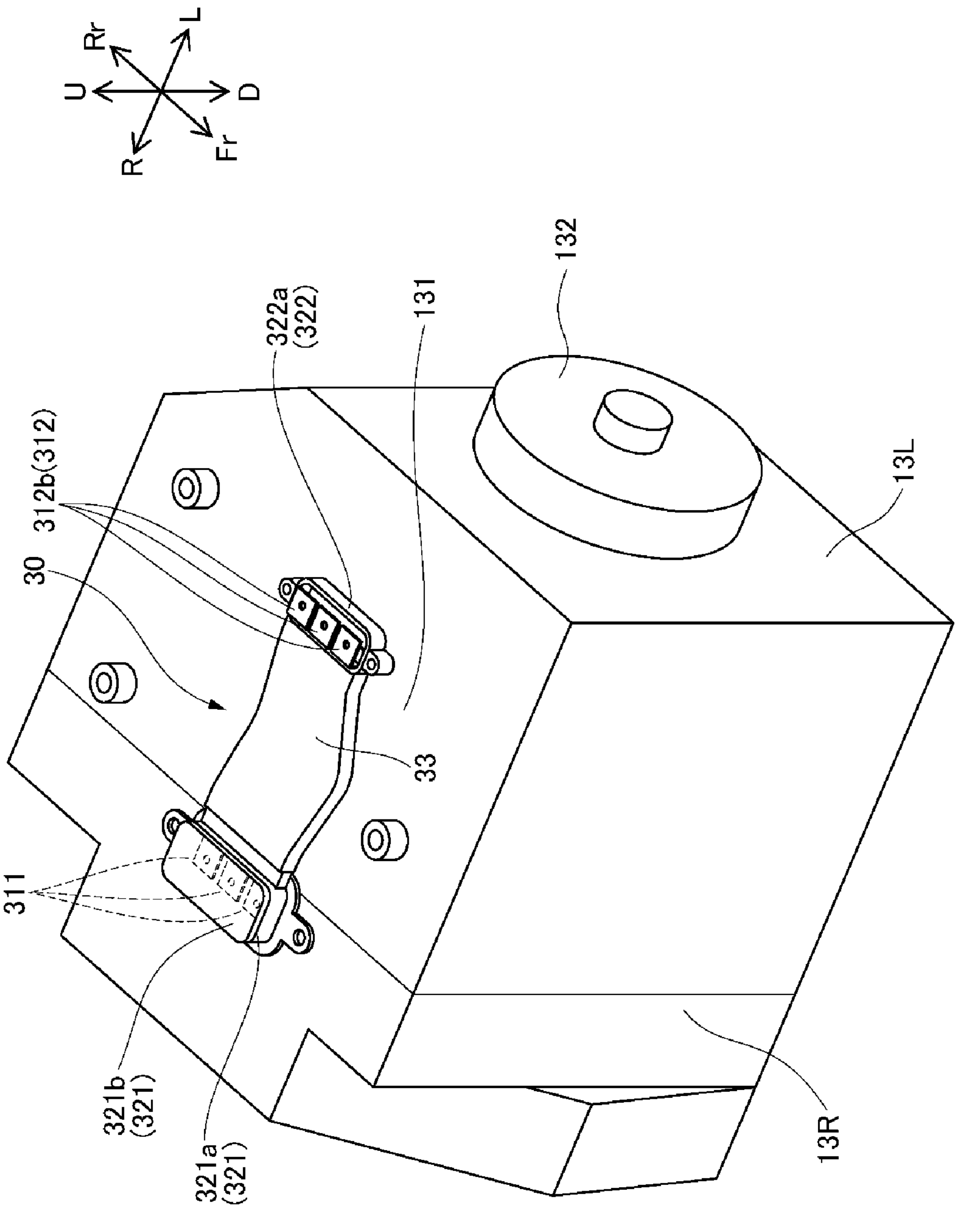
FIG. 4 is a perspective view showing a state in which the connection unit is attached to a drive unit of the drive device of FIG. 1.
Figure 5:
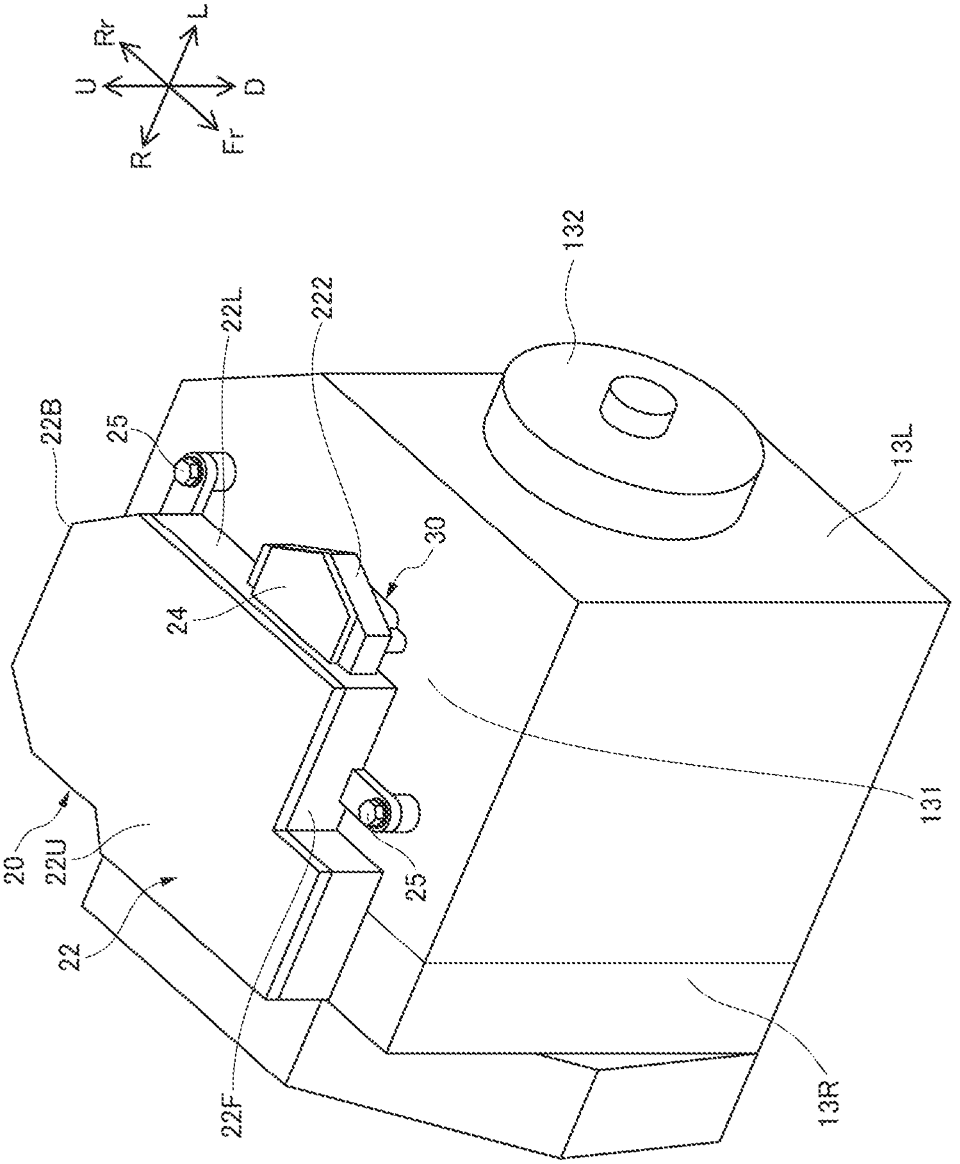
FIG. 5 is a perspective view showing a state in which the connection unit and the control unit are attached to the drive unit of the drive device of FIG. 1.

The rotary-electric-machine-side connection terminal housing 321 includes a lower case 321*a* that covers the rotary-electric-machine-side connection terminal portions 311 from below and opens upward, and an upper cover 321*b* that closes the upward opening of the lower case 321*a* (see FIGS. 4, 7, and 8). Three conductive pedestals 321*c* are fixed to the lower case 321*a*. Each of the conductive pedestals 321*c* is formed of a conductive material such as metal, has a substantially rectangular parallelepiped shape extending in the up-down direction, and has a flange shape at an upper end thereof. Each of the conductive pedestals 321*c* is provided with an insertion hole penetrating in the up-down direction. The rotary-electric-machine-side connection terminal portions 311 are placed on the conductive pedestals 321*c*. The rotary-electric-machine-side connection terminal portions 311 are placed on the conductive pedestals 321*c* such that the insertion holes of the rotary-electric-machine-side connection terminal portions 311 overlap with the insertion holes of the conductive pedestals 321*c*.

The control-device-side connection terminal housing 322 covers the control-device-side connection terminal portions 312 and a part of the left end sides of the extending portions 310.

The control-device-side connection terminal housing 322 includes a lower case 322*a* that covers the control-device-side connection terminal portions 312 from below and opens upward, and fastening nuts 322*b* fixed to the lower case 322*a*. The terminal portions 312*b* of the control-device-side connection terminal portions 312 are placed on the fastening nuts 322*b*. The terminal portions 312*b* of the control-device-side connection terminal portions 312 are placed on the fastening nuts 322*b* such that the insertion holes of the terminal portions 312*b* overlap with the fastening nuts 322*b*.

The extending portions 310 of the connection lines 31 include exposed portions 310*a* exposed from the rotary-electric-machine-side connection terminal housing 321 and the control-device-side connection terminal housing 322. In the present embodiment, the connection unit 30 further includes a cover member 33 that covers the exposed portions 310*a* of the three connection lines 31 (see FIGS. 4 and 8). The cover member 33 is formed of an insulating material such as rubber. Therefore, the exposed portions 310*a* are exposed from the rotary-electric-machine-side connection terminal housing 321 and the control-device-side connection terminal housing 322, and are covered with the cover member 33.

<Arrangement of Control Unit and Connection Unit>

As shown in FIGS. 4 and 6 to 8, the connection unit 30 is fixed to the outer peripheral surface 131 of the drive unit case 13 of the drive unit 10. In the present embodiment, the connection unit 30 is fixed to an upper portion of the outer peripheral surface 131 of the drive unit case 13.

In the connection unit 30, the connection lines 31 extend in the left-right direction, the rotary-electric-machine-side connection terminal housing 321 is fixed to the right case 13R at an upper portion of the rotary electric machine housing portion 130*a* of the drive unit case 13, and the control-device-side connection terminal housing 322 is fixed to the left case 13L at an upper portion of the transmission housing portion 130*b* of the drive unit case 13.

Then, fastening members 341 such as a bolt are inserted into the insertion holes of the rotary-electric-machine-side connection terminal portions 311 and the insertion holes of the conductive pedestals 321*c* from above and fastened to connection terminals (not shown) of the rotary electric machine 11 exposed to the outer peripheral surface 131 of the drive unit case 13, and thereby the rotary-electric-machine-side connection terminal portions 311, the conductive pedestals 321*c*, and the connection terminals of the rotary electric machine 11 are fastened together. Accordingly, the rotary-electric-machine-side connection terminal portions 311 and the connection terminals of the rotary electric machine 11 are electrically connected to each other via the conductive pedestals 321*c*. Then, after the fastening members 341 are fastened to the connection terminals of the rotary electric machine 11, the upper cover 321*b* is fixed to the lower case 321*a*, and thereby an upper side of the rotary-electric-machine-side connection terminal portions 311 is covered with the upper cover 321*b*, which means the rotary-electric-machine-side connection terminal portions 311 are protected.

As shown in FIGS. 5 to 8, the control unit 20 is disposed above the connection unit 30. Therefore, the control unit 20 is disposed at a position facing the outer peripheral surface 131 of the drive unit case 13 with the connection unit 30 interposed therebetween. At this time, the control unit 20 is disposed above the connection unit 30 such that the insertion holes of the connection terminals 231 formed in the three connection lines 23 of the control unit 20 overlap the insertion holes provided in the terminal portions 312*b* of the control-device-side connection terminal portions 312 formed in the respective connection lines 31 of the connection unit 30.

The control unit case 22 is fastened and fixed to the outer peripheral surface 131 of the drive unit case 13 of the drive unit 10 by fastening members 25 such as a bolt at three positions, that is, a substantially central portion of the front wall portion 22F in the left-right direction, a rear end portion of the left wall portion 22L, and a portion slightly to the right of a substantially central portion of the rear wall portion 22B in the left-right direction.

Then, fastening members 342 such as a bolt are inserted from above into the insertion holes of the connection terminals 231 formed in the connection lines 23 of the control unit 20 and the insertion holes provided in the terminal portions 312*b* of the control-device-side connection terminal portions 312 of the connection unit 30 and fastened to the fastening nuts 322*b* of the connection unit 30, and thereby the connection terminals 231 formed in the connection lines 23 of the control unit 20 and the terminal portions 312*b* of the control-device-side connection terminal portions 312 of the connection unit 30 are fastened together. Accordingly, the connection terminals 231 formed in the connection lines 23 of the control unit 20 and the terminal portions 312*b* of the control-device-side connection terminal portions 312 of the connection unit 30 are electrically connected to each other. Then, after the fastening members 342 are fastened to the fastening nuts 322*b*, the terminal cover member 24 of the control unit 20 is fixed to the upper surface of the terminal protection wall portion 222 to close the opening portion 222*a*, and thereby the terminal cover member 24 is covered above the connection terminals 231 formed on the connection lines 23 of the control unit 20 and the terminal portions 312*b* of the control-device-side connection terminal portions 312 of the connection unit 30, and the connection terminals 231 formed on the connection lines 23 of the control unit 20 and the terminal portions 312*b* of the control-device-side connection terminal portions 312 of the connection unit 30 are protected.

Figure 6:
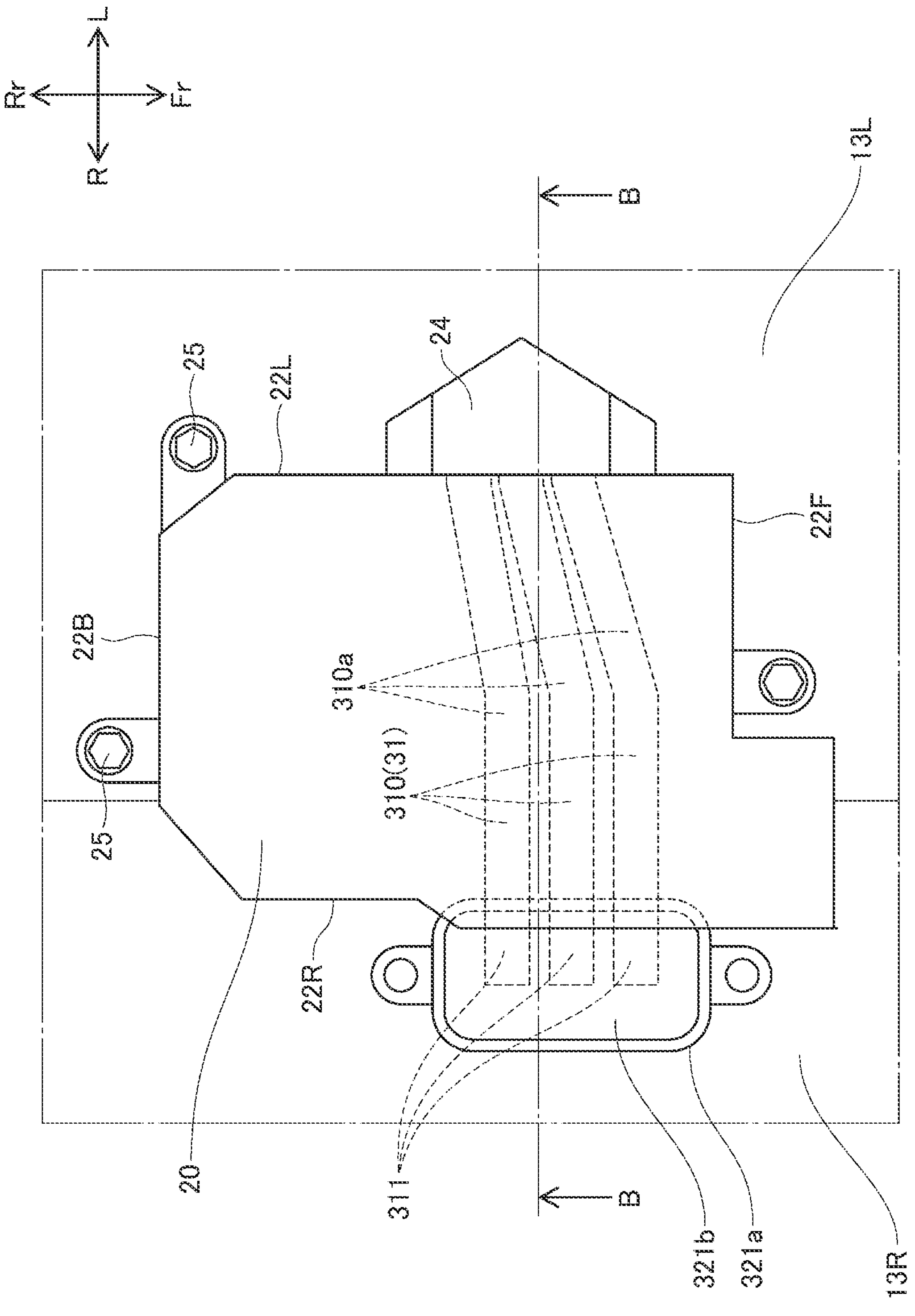
FIG. 6 is a top view of the vicinity of the connection unit and the control unit shown in FIG. 5 as viewed from above.
Figure 7:
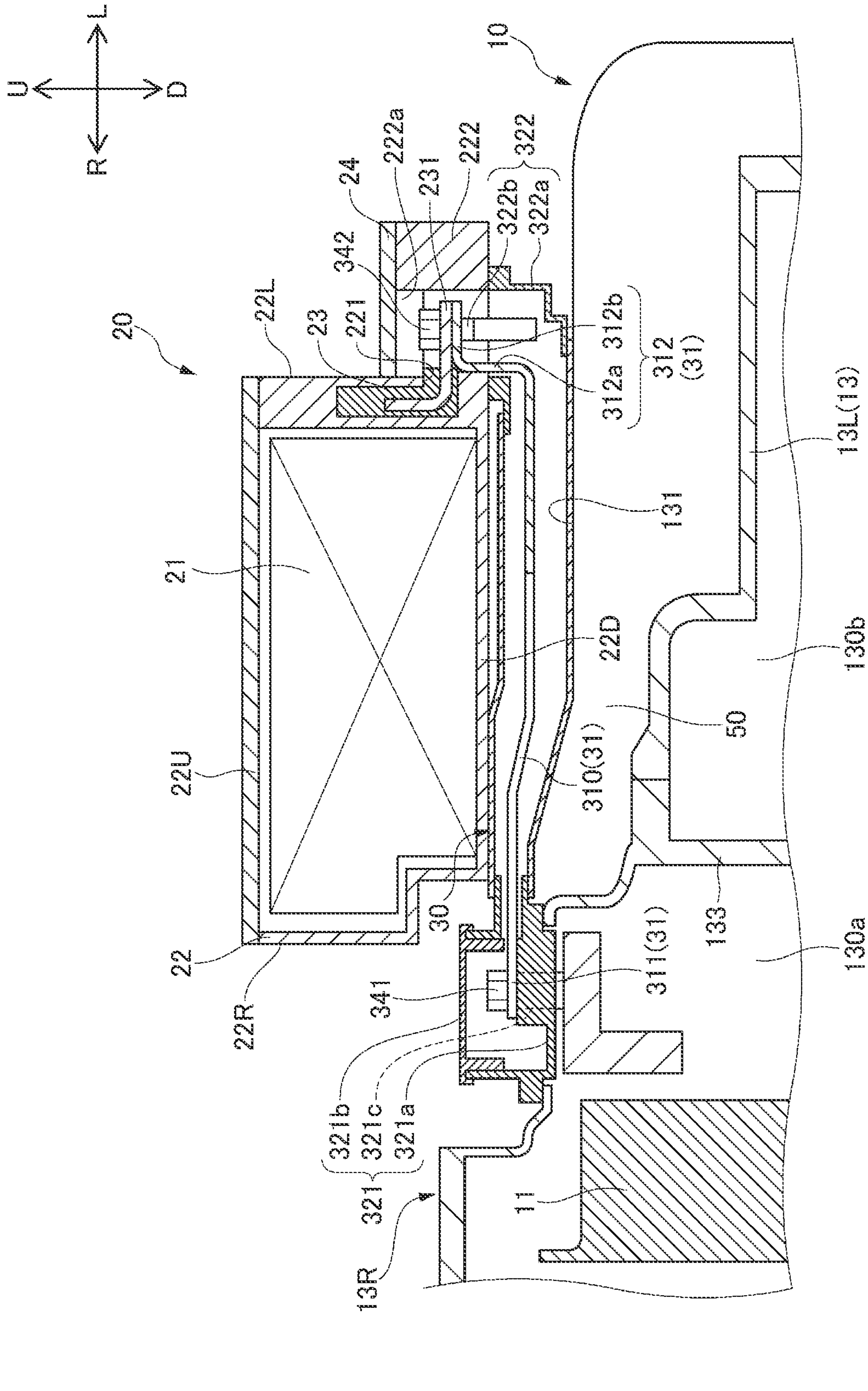
FIG. 7 is a view showing main parts of a cross section taken along a line B-B of FIG. 6.
Figure 8:
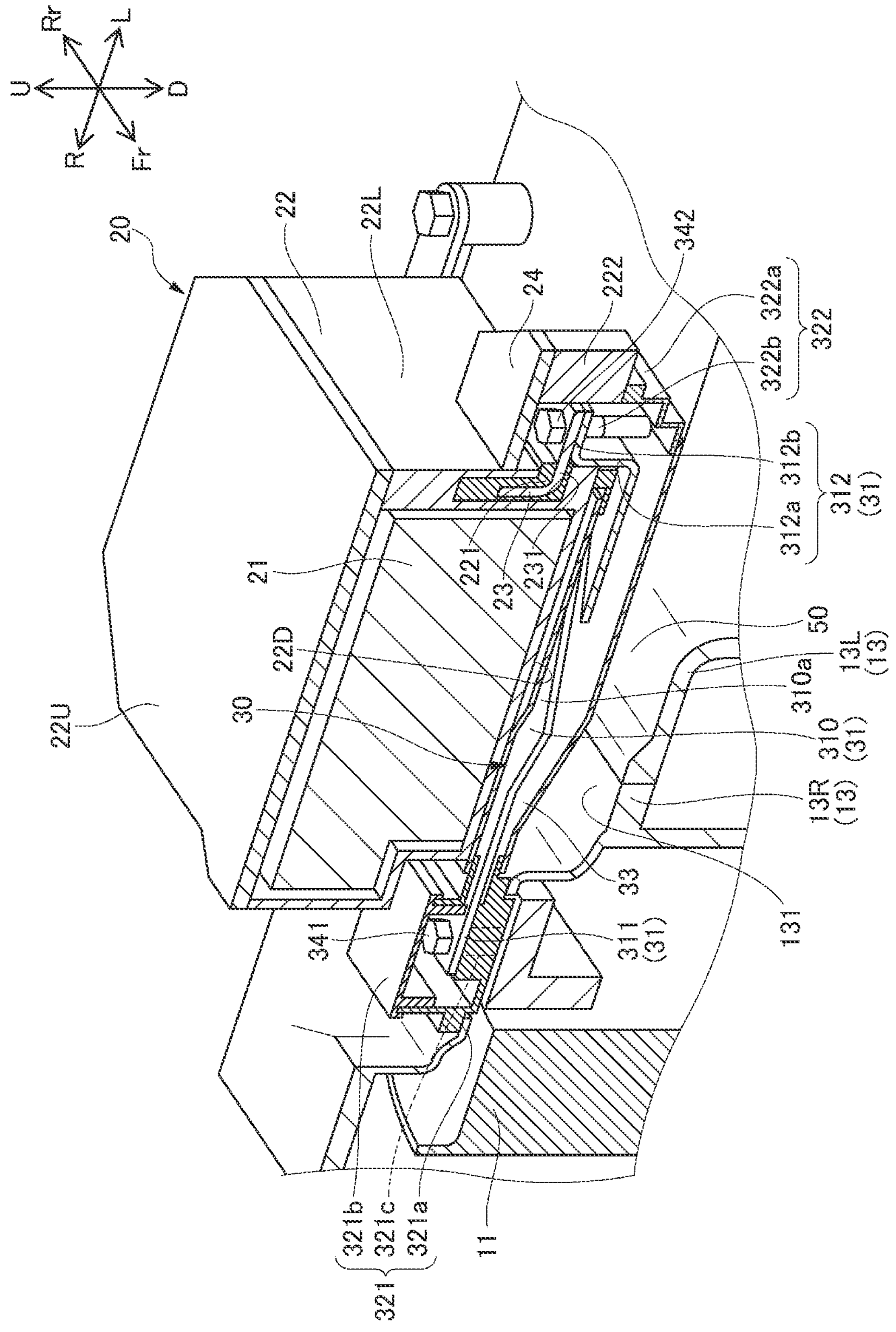
FIG. 8 is a perspective view showing the main parts of the cross section taken along the line B-B of FIG. 6.

In this way, as shown in FIGS. 6 to 8, the control unit 20 is disposed at the position facing the outer peripheral surface 131 of the drive unit case 13, and faces the outer peripheral surface 131 of the drive unit case 13 radially outward at a predetermined distance. A space portion 50 is formed between the outer peripheral surface 131 of the drive unit case 13 and the control unit 20, and the connection lines 31 of the connection unit 30 extend in the left-right direction through the space portion 50 to electrically connect the rotary electric machine 11 of the drive unit 10 and the control device 21 of the control unit 20. In the present embodiment, a direction in which the outer peripheral surface 131 of the drive unit case 13 and the control unit 20 face each other is the up-down direction.

Accordingly, since the connection lines 31 of the connection unit 30 are provided so as to pass through the space portion 50 surrounded by the drive unit case 13 and the control unit 20, the electromagnetic noise generated from the connection lines 31 is transmitted through the drive unit case 13 and the control unit 20 to be grounded. Accordingly, the electromagnetic noise generated from the connection lines 31 can be prevented from propagating to an outside such as a vehicle interior. Further, since the connection lines 31 of the connection unit 30 are provided to pass through the space portion 50 protected by the drive unit case 13 and the control unit 20, the connection lines 31 can be protected without separately providing a protection member for protecting the connection lines 31 at a time of a collision and a protection member for preventing the connection lines 31 from coming into contact with another member and causing a short circuit or the like.

At this time, as shown in FIG. 6, the extending portions 310 of the connection lines 31 of the connection unit 30 are the flat plate-shaped bus bars, and the exposed portions 310*a* of the extending portions 310 of the connection lines 31 are covered with the control unit 20 when viewed from the up-down direction which is the direction in which the outer peripheral surface 131 of the drive unit case 13 and the control unit 20 face each other.

Accordingly, in the connection unit 30, since the electromagnetic noise generated from the exposed portions 310*a* of the extending portions 310 of the connection lines 31 is more reliably transmitted through the drive unit case 13 and the control unit 20 to be grounded, the electromagnetic noise generated from the connection lines 31 can be prevented from propagating to the vehicle interior or the like. Further, since the extending portions 310 of the connection lines 31 are the flat plate-shaped bus bars, the connection unit 30 can be provided such that the connection lines 31 pass through the space portion 50 even when the distance between the outer peripheral surface 131 of the drive unit case 13 and the control unit 20 in the space portion 50 is reduced. Therefore, the distance between the outer peripheral surface 131 of the drive unit case 13 and the control unit 20 in the space portion 50 can be reduced, and the drive device 1 can be downsized.

As shown in FIGS. 7 and 8, the connection unit 30 is provided such that the rotary-electric-machine-side connection terminal portions 311 are disposed on the right side of the control device 21 of the control unit 20 and the control-device-side connection terminal portions 312 are disposed on the left side of the control device 21 of the control unit 20 in the left-right direction.

Therefore, the connection lines 31 of the connection unit 30 and the control unit 20 can be connected at a position separated from a connection position of the connection lines 31 of the connection unit 30 and the rotary electric machine 11 of the drive unit 10. Therefore, even when the connection positions of the connection lines 31 of the connection unit 30 and the rotary electric machine 11 of the drive unit 10 are arranged in a narrow space, the connection lines 31 of the connection unit 30 and the control unit 20 can be easily connected and detached. As a result, assemblability of the control unit 20 to the drive device 1 is improved. Furthermore, even when the control unit 20 is disposed so as to reduce the space around the connection position between the connection lines 31 of the connection unit 30 and the rotary electric machine 11 of the drive unit 10, since the connection lines 31 of the connection unit 30 and the control unit 20 can be easily connected and detached, a degree of freedom in the arrangement of the control unit 20 is improved, and the drive device 1 can be downsized.

<Internal Combustion Engine>

Returning to FIGS. 1 and 2, internal combustion engine accessory components for driving the internal combustion engine 40 are attached to the internal combustion engine 40. Examples of the internal combustion engine accessory components attached to the internal combustion engine 40 include an alternator, an oil pump, a fuel injection pump, a water pump, a coolant bypass unit, an intake manifold, an exhaust manifold, and the like.

In the present embodiment, a cooling water bypass unit 41 including a thermostat 42 and serving as one of the internal combustion engine accessory components is attached so as to protrude from the internal combustion engine 40 toward a side where the drive unit 10 is disposed in the axial direction, that is, toward the left side at a position at which at least a part of the cooling water bypass unit 41 overlaps the control unit 20 in the circumferential direction when viewed from the axial direction, that is, above the drive unit 10.

Then, the rotary-electric-machine-side connection terminal portions 311 of the connection unit 30 are disposed in a space 60 surrounded by the left wall portion of the internal combustion engine 40, the cooling water bypass unit 41, the outer peripheral surface 131 of the drive unit case 13, and the control unit 20.

At this time, the connection unit 30 is provided such that the control-device-side connection terminal portions 312 are disposed on the left side of the control device 21 of the control unit 20 in the left-right direction. Therefore, even when the space 60 surrounded by the left wall portion of the internal combustion engine 40 in which the rotary-electric-machine-side connection terminal portions 311 of the connection unit 30 are disposed, the cooling water bypass unit 41, the outer peripheral surface 131 of the drive unit case 13, and the control unit 20 is small, the connection lines 31 of the connection unit 30 and the control unit 20 can be easily connected and detached on a side opposite to the control unit 20 in the axial direction. As a result, the assemblability of the control unit 20 to the drive device 1 is improved. Further, even when the space 60 surrounded by the left wall portion of the internal combustion engine 40, the cooling water bypass unit 41, the outer peripheral surface 131 of the drive unit case 13, and the control unit 20 is made small and the rotary-electric-machine-side connection terminal portions 311 of the connection unit 30 are disposed therein, since the connection lines 31 of the connection unit 30 and the control unit 20 can be easily connected and detached, the degree of freedom in the arrangement of the control unit 20 is improved, and the drive device 1 can be downsized.

Although one embodiment of the present invention has been described above with reference to the accompanying drawings, it is needless to say that the present invention is not limited to such an embodiment. It is apparent to those skilled in the art that various changes and modifications can be conceived within the scope of the claims, and it is also understood that such variations and modifications belong to the technical scope of the present invention. In addition, the constituent elements in the above-described embodiment may be freely combined without departing from a spirit of the invention.

For example, in the present embodiment, the extending portions 310 of the connection lines 31 of the connection unit 30 are the flat plate-shaped bus bars, and may be braided wires.

For example, in the present embodiment, the control unit 20 is disposed above the drive unit 10, the control unit 20 is not limited to being disposed above the drive unit 10, and may be disposed at a position facing the outer peripheral surface 131 of the drive unit case 13 of the drive unit 10. In other words, in the present embodiment, the direction in which the outer peripheral surface 131 of the drive unit case 13 and the control unit 20 face each other is the up-down direction, and this facing direction may be any radial direction.

For example, in the present embodiment, the extending portions 310 of the connection lines 31 of the connection unit 30 extend in the axial direction, and may extend in the front-rear direction (circumferential direction).

Further, for example, in the present embodiment, the cooling water bypass unit 41 including the thermostat 42 and serving as one of the internal combustion engine accessory components is attached so as to protrude from the internal combustion engine 40 toward the side where the drive unit 10 is disposed in the axial direction, that is, toward the left side at a position at which at least a part of the cooling water bypass unit 41 overlaps the control unit 20 in the circumferential direction when viewed from the axial direction, that is, above the drive unit 10, and the internal combustion engine accessory components other than the cooling water bypass unit 41 including the thermostat 42 may be attached so as to protrude from the internal combustion engine 40 to the side where the drive unit 10 is disposed in the axial direction at a position at which at least a part of the cooling water bypass unit 41 overlaps the control unit 20 in the circumferential direction when viewed from the axial direction.

Further, for example, in the present embodiment, the drive device 1 is mounted on the vehicle, and may be mounted on a device other than the vehicle.

In the present description, at least the following matters are described. In parentheses, the corresponding constituent elements and the like in the above-described embodiment are shown as an example, but the present invention is not limited thereto.

(1) A drive device (drive device 1) includes:

a drive device (drive unit 10) including a rotary electric machine (rotary electric machine 11) and a drive unit case (drive unit case 13) that houses the rotary electric machine;

a control unit (control unit 20) including a control device (control device 21) configured to control the rotary electric machine and a control unit case (control unit case 22) that houses the control device; and a connection unit (connection unit 30) including a connection line (connection lines 31) that electrically connects the rotary electric machine and the control device, in which the connection line includes:

an extending portion (extending portion 310) extending in a predetermined direction;

a rotary-electric-machine-side connection terminal portion (rotary-electric-machine-side connection terminal portion 311) provided at one end portion of the extending portion and electrically connected to the rotary electric machine; and a control-device-side connection terminal portion (control-device-side connection terminal portion 312) provided at another end portion of the extending portion and electrically connected to the control device, the drive unit case has an outer peripheral surface (outer peripheral surface 131) extending in a circumferential direction of a rotation axis line (rotation axis line RC) of the rotary electric machine, the control unit is disposed at a position facing the outer peripheral surface of the drive unit case, a space portion (space portion 50) is provided between the outer peripheral surface of the drive unit case and the control unit, and the connection unit is provided such that the connection line electrically connects the rotary electric machine and the control device through the space portion.

According to (1), since the connection line of the connection unit is provided so as to pass through the space portion surrounded by the drive unit case and the control unit, an electromagnetic noise generated from the connection line is transmitted through the drive unit case and the control unit to be grounded. Accordingly, the electromagnetic noise generated from the connection line can be prevented from propagating to an outside such as a vehicle interior. Further, since the connection line of the connection unit is provided to pass through the space portion protected by the drive unit case and the control unit, the connection line can be protected without separately providing a protection member for protecting the connection line at a time of a collision and a protection member for preventing the connection line from coming into contact with another member and causing a short circuit or the like.

(2) The drive device according to (1), in which the connection unit includes:

a rotary-electric-machine-side connection terminal housing (rotary-electric-machine-side connection terminal housing 321) that houses the rotary electric machine side connection terminal portion; and a control-device-side connection terminal housing (control-device-side connection terminal housing 322) that houses the control-device-side connection terminal portion, the extending portion of the connection line is a flat plate-shaped bus bar, and includes an exposed portion (exposed portions 310*a*) exposed from the rotary-electric-machine-side connection terminal housing and the control-device-side connection terminal housing, and the exposed portion is covered by the control unit when viewed from a direction in which the outer peripheral surface of the drive unit case and the control unit face each other.

According to (2), since the exposed portion is covered with the control unit when viewed from the direction in which the outer peripheral surface of the drive unit case and the control unit face each other, the electromagnetic noise generated from the exposed portion is more reliably transmitted through the drive unit case and the control unit to be grounded, and the electromagnetic noise generated from the connection line can be prevented from being propagating to the vehicle interior or the like. Further, since the extending portion of the connection line is the flat plate-shaped bus bar, the connection unit can be provided such that the connection line passes through the space portion even when the distance between the outer peripheral surface of the drive unit case and the control unit in the space portion is reduced. Therefore, the distance between the outer peripheral surface of the drive unit case and the control unit in the space portion can be reduced, and the drive device can be downsized.

(3) The driving device according to (1) or (2), in which the connection unit is provided such that in a first direction (left-right direction) orthogonal to the direction (up-down direction) in which the outer peripheral surface of the drive unit case and the control unit face each other, the extending portion extends in the first direction, the rotary-electric-machine-side connection terminal portion is disposed on one end side (right end side) of the control device in the first direction, and the control-device-side connection terminal portion is disposed on another end side (left end side) of the control device in the first direction.

According to (3), in the connection unit, since the rotary-electric-machine-side connection terminal portion is disposed on one end side of the control device in the first direction, and the control-device-side connection terminal portion is disposed on the other end side of the control device in the first direction, the connection line of the connection unit and the control unit can be connected at a position separated from the connection position of the connection line of the connection unit and the rotary electric machine. Therefore, even when the connection position of the connection line of the connection unit and the rotary electric machine is arranged in a narrow space, the connection line of the connection unit and the control unit can be easily connected and detached. As a result, the assemblability of the control unit to the drive device is improved. Furthermore, even when the control unit is disposed so as to reduce the space around the connection position between the connection line of the connection unit and the rotary electric machine, since the connection line of the connection unit and the control unit can be easily connected and detached, a degree of freedom in the arrangement of the control unit is improved, and the drive device can be downsized.

(4) The drive device according to (3), in which the drive device further includes:

an internal combustion engine (internal combustion engine 40), and an internal combustion engine accessory component (cooling water bypass unit 41) attached to the internal combustion engine, the internal combustion engine is disposed adjacent to one end side of the drive unit in an axial direction of the rotation axis line, the internal combustion engine accessory component is attached at a position at which at least a part of the internal combustion engine accessory component overlaps the control unit in the circumferential direction when viewed from the axial direction, and attached so as to protrude from the internal combustion engine toward a side where the drive unit is disposed in the axial direction, the first direction is the axial direction, and the rotary-electric-machine-side connection terminal portion is disposed in a space (space 60) surrounded by the internal combustion engine, the internal combustion engine accessory component, the outer peripheral surface of the drive unit case, and the control unit.

According to (4), even when the space that is surrounded by the internal combustion engine, the internal combustion engine accessory component, the outer peripheral surface of the drive unit case, and the control unit and in which the rotary-electric-machine-side connection terminal portion of the connection unit is disposed is small, the connection line of the connection unit and the control unit can be easily connected and detached in the space on a side opposite to the control unit in the axial direction. As a result, the assemblability of the control unit to the drive device is improved. Further, even when the space is reduced and the rotary-electric-machine-side connection terminal portion of the connection unit is disposed, since the connection line of the connection unit and the control unit can be easily connected and detached, the degree of freedom in the arrangement of the control unit is improved, and the drive device can be downsized.

What is claimed is:

1. A drive device comprising:

a drive unit including a rotary electric machine and a drive unit case that houses the rotary electric machine;

a control unit including a control device configured to control the rotary electric machine and a control unit case that houses the control device; and a connection unit including a connection line that electrically connects the rotary electric machine and the control device, wherein the connection line includes:

an extending portion extending in a predetermined direction;

a rotary-electric-machine-side connection terminal portion provided at one end portion of the extending portion and electrically connected to the rotary electric machine; and a control-device-side connection terminal portion provided at another end portion of the extending portion and electrically connected to the control device, the drive unit case has an outer peripheral surface extending in a circumferential direction of a rotation axis line of the rotary electric machine, the control unit is disposed at a position facing the outer peripheral surface of the drive unit case, a space portion is provided between the outer peripheral surface of the drive unit case and the control unit, and the connection unit is provided such that the connection line electrically connects the rotary electric machine and the control device through the space portion.

2. The drive device according to claim 1, wherein the connection unit includes:

a rotary-electric-machine-side connection terminal housing that houses the rotary-electric-machine-side connection terminal portion; and a control-device-side connection terminal housing that houses the control-device-side connection terminal portion, the extending portion of the connection line is a flat plate-shaped bus bar, and includes an exposed portion exposed from the rotary-electric-machine-side connection terminal housing and the control-device-side connection terminal housing, and the exposed portion is covered by the control unit when viewed from a direction in which the outer peripheral surface of the drive unit case and the control unit face each other.

3. The drive device according to claim 1, wherein the connection unit is provided such that in a first direction orthogonal to the direction in which the outer peripheral surface of the drive unit case and the control unit face each other, the extending portion extends in the first direction, the rotary-electric-machine-side connection terminal portion is disposed on one end side of the control device in the first direction, and the control-device-side connection terminal portion is disposed on another end side of the control device in the first direction.

4. The drive device according to claim 3, wherein the drive device further includes:

an internal combustion engine; and an internal combustion engine accessory component attached to the internal combustion engine, the internal combustion engine is disposed adjacent to one end side of the drive unit in an axial direction of the rotation axis line, the internal combustion engine accessory component is attached at a position at which at least a part of the internal combustion engine accessory component overlaps the control unit in the circumferential direction w % ben viewed from the axial direction, and attached so as to protrude from the internal combustion engine toward a side where the drive unit is disposed in the axial direction, the first direction is the axial direction, and the rotary-electric-machine-side connection terminal portion is disposed in a space surrounded by the internal combustion engine, the internal combustion engine accessory component, the outer peripheral surface of the drive unit case, and the control unit.

* * * * *